United States Patent
Oki et al.

(10) Patent No.: US 7,566,063 B2
(45) Date of Patent: Jul. 28, 2009

(54) WHEEL SUSPENSION SYSTEM

(75) Inventors: Toshiyuki Oki, Kanagawa (JP); Takuya Murakami, Kanagawa (JP); Michihito Hirahara, Yokohama (JP); Akira Yamaguchi, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 414 days.

(21) Appl. No.: 11/185,017

(22) Filed: Jul. 20, 2005

(65) Prior Publication Data

US 2006/0017252 A1    Jan. 26, 2006

(30) Foreign Application Priority Data

Jul. 21, 2004    (JP)    ............... 2004-212922
Nov. 18, 2004    (JP)    ............... 2004-334860

(51) Int. Cl.
*B60G 21/05*    (2006.01)
*B60G 21/055*    (2006.01)

(52) U.S. Cl. ............... 280/124.106; 280/124.13; 280/124.128; 280/124.166

(58) Field of Classification Search .......... 280/124.106, 280/124.13, 124.166, 124.128
See application file for complete search history.

(56) References Cited

U.S. PATENT DOCUMENTS

| 3,844,583 | A | * | 10/1974 | Sakow et al. ........... 280/124.102 |
| 4,429,900 | A | * | 2/1984 | Feher ................... 280/124.128 |
| 4,765,647 | A | * | 8/1988 | Kondo et al. ........... 280/124.128 |
| 4,951,962 | A | * | 8/1990 | Tomida et al. .......... 280/124.108 |
| 5,277,450 | A | * | 1/1994 | Henschen ................ 280/6.151 |
| 5,326,128 | A | * | 7/1994 | Cromley, Jr. ................ 280/656 |
| 6,447,073 | B1 | * | 9/2002 | Goettker ..................... 301/127 |
| 6,533,300 | B1 | * | 3/2003 | Hicks et al. ............ 280/124.106 |
| 2002/0079666 | A1 | * | 6/2002 | Basnett ................ 280/124.128 |
| 2003/0080526 | A1 | * | 5/2003 | Conover .............. 280/124.106 |
| 2004/0256828 | A1 | * | 12/2004 | Han et al. ............. 280/124.106 |

FOREIGN PATENT DOCUMENTS

| EP | 0 452 835 A1 | 10/1991 |
| FR | 2544259 A1 | 10/1984 |
| FR | 2547540 A1 | 12/1984 |
| GB | 2 187 524 A | 9/1987 |
| JP | 58-012008 U | 1/1983 |

* cited by examiner

*Primary Examiner*—Christopher P Ellis
*Assistant Examiner*—Jacob Meyer
(74) *Attorney, Agent, or Firm*—Foley & Lardner LLP (57) ABSTRACT

A wheel suspension system for suspending wheels rotatably supported by axle members for a vehicle is comprised of a pair of trailing arms which extends in a vehicle longitudinal direction and are connected to the axle members, respective; a pair of torsion bar cases which extend in a vehicle lateral direction and whose lateral outside portion is connected to the trailing arm; a pair of torsion bars which are connected to lateral inside portions of the torsion bar cases and whose lateral outside portions are connected to a vehicle body; and a connecting beam which extends in the vehicle lateral direction and connects the pair of torsion bar cases.

19 Claims, 11 Drawing Sheets

WHEEL SUSPENSION SYSTEM

BACKGROUND OF THE INVENTION

The present invention relates to a suspension system for suspending wheels, and more particularly to a wheel suspension system which is capable of decreasing noises caused by inputs inputted from a road to wheels of a vehicle.

Japanese Published Utility Model Application No. 58-12008 has proposed a trailing arm type wheel suspension system in that a movement of an axle for each wheel is limited in the toe direction by a trailing arm which has a shape of extending in the vehicle longitudinal direction and of becoming wider from a rear position toward a front position in the vehicle longitudinal direction. A front portion of the trailing arm is rotatably connected to a shaft extending in the vehicle lateral direction through each of vehicle body brackets provided at both ends of the shaft. A rear portion of the trailing arm is elastically supported by a leaf spring provided under the trailing arm.

Other trailing arm type wheel suspension system has been proposed such that a pair of torsion bar cases extending in the vehicle lateral direction are connected to lateral outside portions of a vehicle body through a torsion bar which is connected through serrations to the lateral inside portions of torsion bar cases and extends in the lateral outside direction of the torsion bar cases. Further, the lateral inside portion of the torsion bar cases are connected to a bottom surface of the lateral inside portion of the vehicle body through bush, and a front portion of each trailing arm is rotatably connected to the vehicle body.

These suspension systems are capable of preventing the vibrations generated at wheels and axle members due to the road input from being directly transferred to a vehicle body, by utilizing a bending reaction force of the leaf spring or a torsional reaction force of the torsion bar as a spring element.

SUMMARY OF THE INVENTION

However, since the suspension systems are arranged to connect the shaft or torsion bar to the bottom surface at the lateral inside portion of the vehicle body in order to certainly support the shaft of torsion bar extending in the lateral direction, a vibration transferring pass of transferring the vibrations of the wheels and the axle members to the floor through the shaft. Therefore, these suspension systems have been yet required to further decrease such vibration transferring.

It is therefore an object of the present invention to provide a wheel suspension system which solves the above discussed problems and which is capable of decreasing noises in a passenger compartment which noises are caused by inputs inputted from a traveling road to wheels.

An aspect of the present invention resides in a wheel suspension system for suspending wheels rotatably supported by axle members for a vehicle. The wheel suspension system comprises a pair of trailing arms which extends in a vehicle longitudinal direction and are connected to the axle members, respective; a pair of torsion bar cases which extend in a vehicle lateral direction and whose lateral outside portion is connected to the trailing arm; a pair of torsion bars which are connected to lateral inside portions of the torsion bar cases and whose lateral outside portions are connected to a vehicle body; and a connecting beam which extends in the vehicle lateral direction and connects the pair of torsion bar cases.

Another aspect of the present invention resides in a wheel suspension system for suspending wheels rotatably supported by axle members for a vehicle. The wheel suspension system comprises a pair of trailing arms which extend in a first direction and are connected to the axle members, respective; a pair of torsion bar cases which extend in a second direction perpendicular to the first direction, and whose outside portions are connected to the trailing arms; a pair of torsion bars which extend in the second direction and are connected to inside portions of the torsion bar cases, and whose outside portion are connected to a vehicle body; and a connecting beam which extends in the second direction and connects the pair of torsion bar cases.

The other objects and features of this invention will become understood from the following description with reference to the accompanying drawings.

DETAILED DESCRIPTION OF THE INVENTION

Hereinafter, there is discussed an embodiment of the present invention in detail with reference to the drawings.

Figure 1:
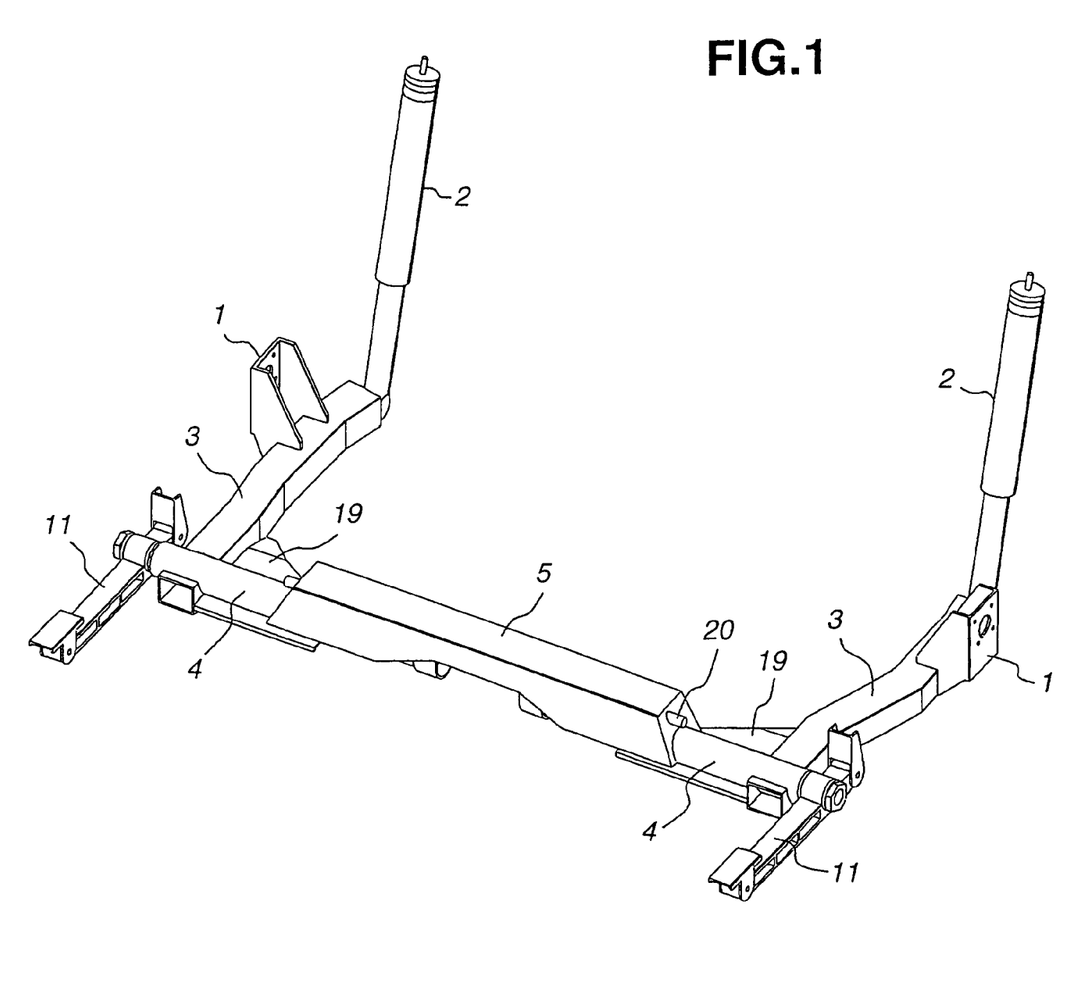
FIG. 1 is a schematic perspective view showing a wheel suspension system according to a first embodiment of the present invention.

FIG. 1 is a schematic view showing a wheel suspension system according to the embodiment of the present invention, as viewed from an obliquely front upper position thereof.

The wheel suspension system according the embodiment of the present invention is arranged to connect axle members (not shown) of rotatably supporting wheels W to trailing arms 3 through axle brackets 1, respectively, and to connect a rear end of each trailing arm 3 to a vehicle body (not shown) through a shock absorber 2 extending in the vertical direction and a bush (not shown), to connect a front end portion of each trailing arm 3 to each lateral outside portion of a cylindrical torsion bar case 4 which extends in the lateral direction of the vehicle, to connect a pair of torsion bar 8 respectively to a pair of torsion bar cases 4 through serrations and the like, and to connect the vehicle body to the lateral outside portions of torsion bars 8. This arrangement constructs a pair of right and left wheel suspension systems.

Figure 4:
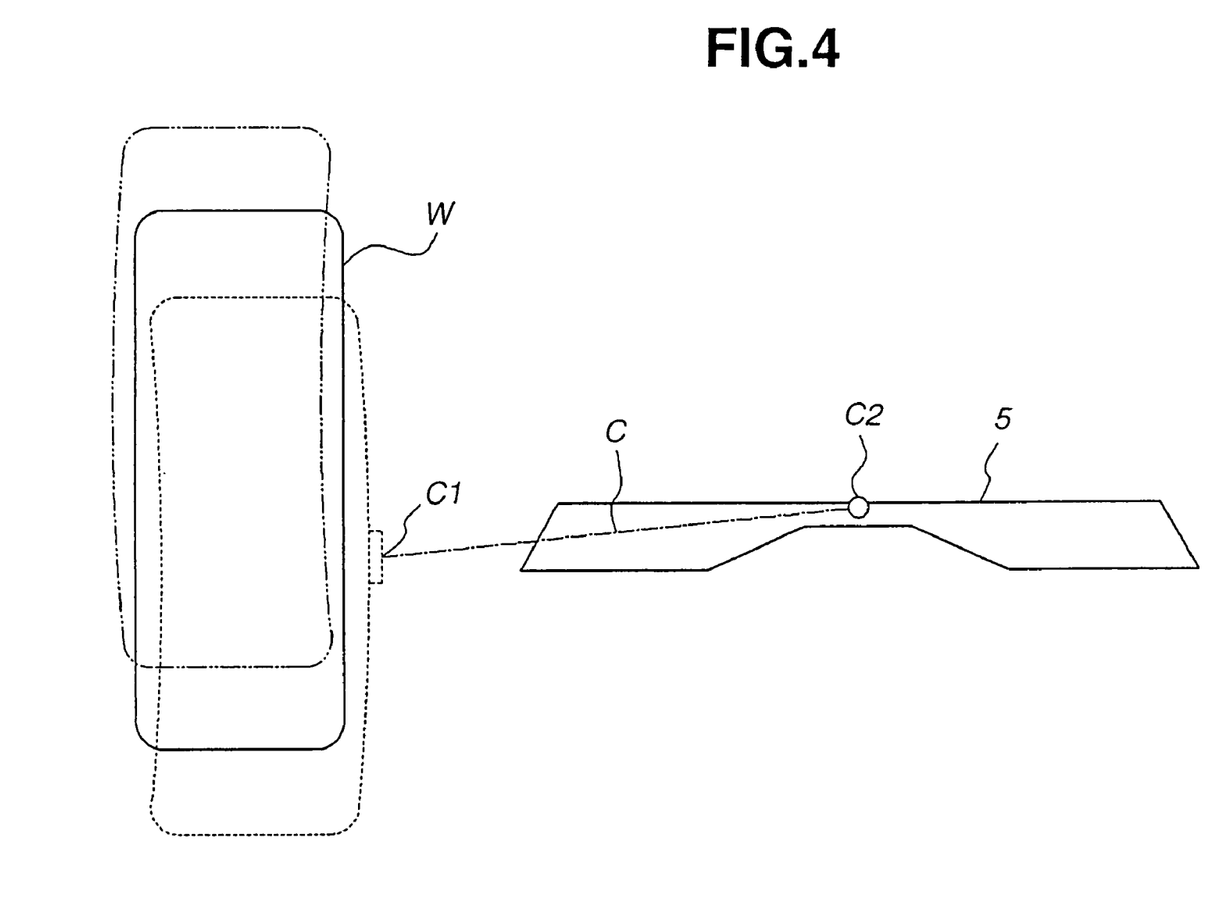
FIG. 4 is a schematic rear view showing the roll steer function of the wheel suspension system of FIG. 1.

The pair of right and left torsion bar cases 4 are connected with each other through a connecting beam 5 extending in the vehicle lateral direction. Herein, connecting beam 5 in the embodiment of the present invention is a box shape opened in the downward direction, as shown in FIG. 4. By this box-shaped arrangement, a bending rigidity per unit mass of connecting beam 5 is heightened as compared with that of a solid type, and a torsion rigidity of connecting beam 5 is lowered. Therefore, it becomes possible to move the torsion center to a further upper position and to decrease the weight of the suspension system. Further, by fixing only both ends of connecting beam 5 to torsion bar cases 4, it becomes possible to twist throughout connecting beam 5. Accordingly, it becomes possible to decrease a torsion quantity per unit length of connecting beam 5, and the durability of the suspension system is improved thereby.

Figure 2:
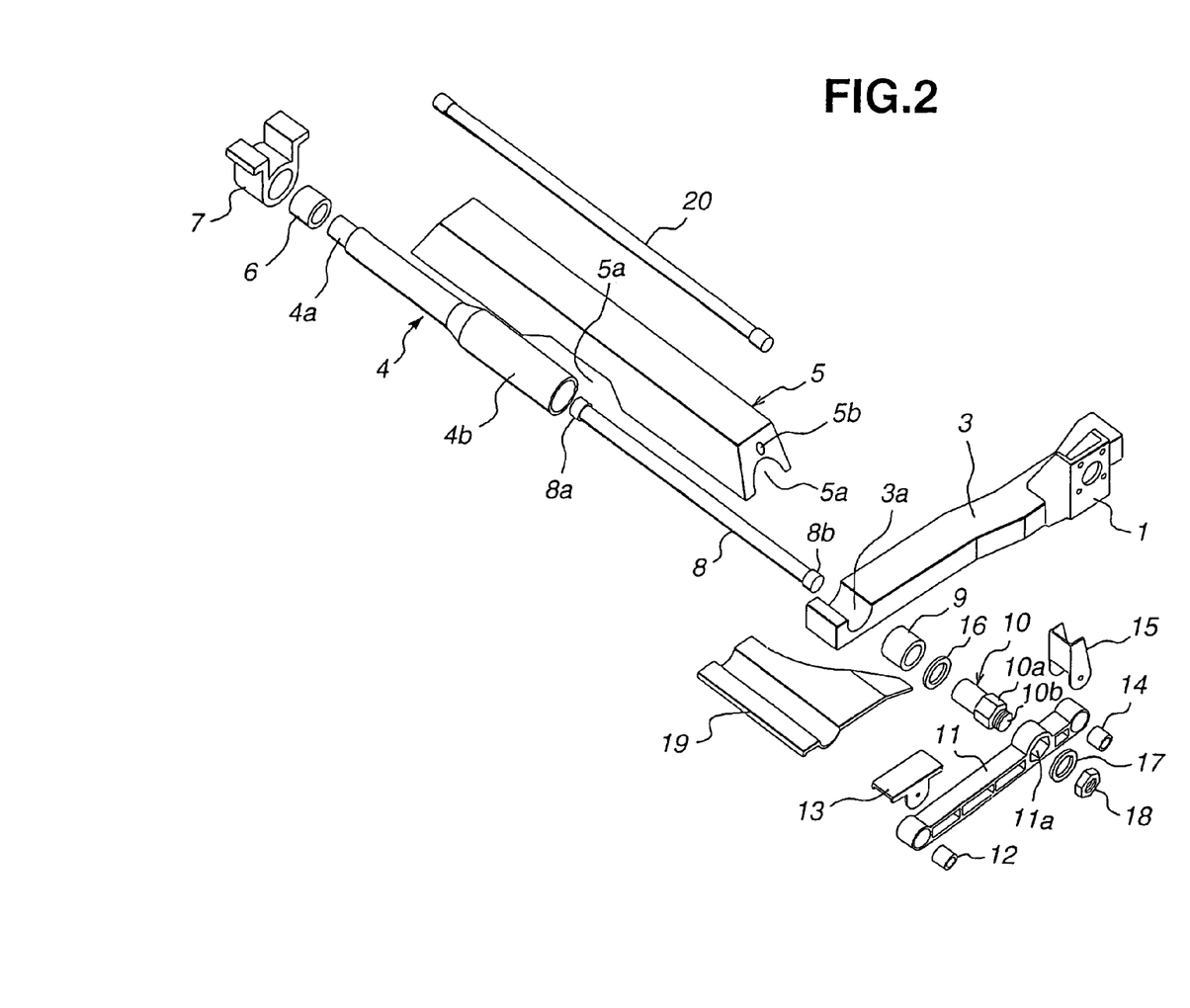
FIG. 2 is an exploded perspective view showing an essential part of the wheel suspension system of FIG. 1.

FIG. 2 is an exploded schematic view showing an essential part of the wheel suspension system of FIG. 1, as viewed from the obliquely front upward position of the vehicle. A lateral inner portion 4a of each torsion bar case 4 is rotatably connected to lateral-center cutout portion 5a of connecting beam 5 through an inner bush 6 and an inner bracket 7. By this arrangement, it becomes possible to further certainly support torsion bar cases 4 and torsion bars 8, as compared with the case that the lateral inside portion of each torsion bar case 4 is set at a free end.

Connecting portion 4b of each of cylindrical torsion bar cases 4 relative to connecting beam 5 and each trailing arm 3 is formed to be greater in diameter than lateral inner portions of the torsion bar case 4. Connecting portions 4b are connected to semi-cylindrical cutout portions 5a formed at lower portions of lateral both ends of connecting beam 5 and semi-cylindrical cutout portions 3a of trailing arms 3 by welding, respectively. By forming connecting portions 4b to be larger in diameter than other portions of torsion bar case 4, it becomes possible to heighten a moment resistance force of the welded portions to torsion bar cases 4, connecting beam 5 and trailing arms 3.

A lateral inner portion 8a of each torsion bar 8 is connected to an inner circumferential surface of the lateral inner portion 4a of each torsion bar case 4 through serrations. A lateral outer portion of each torsion bar 8 is rotatably supported at an inner circumferential surface of each torsion bar case 4 through an outer bush 9. A lateral outer portion 8b of each torsion bar case 8 is connected to a link member 10 through serrations. Link member 10 has a hexagonal nut 10a which is screwed to a hexagonal hole 11a of an outer mount 11. Outer mount 11 extends in the vehicle longitudinal direction, and a front end portion thereof is connected a lateral outer beam of a vehicle body through a bush 12 and a bracket 13, and a rear end portion thereof is also connected to the lateral outer beam through a bush 14 and a bracket 15. Further, a washer 16 is provided between outer bush 9 and link member 10. A screw portion 10b provided at link portion 10 is screwed with a nut 18 through a washer 17. With this arrangement, the lateral outer portion of each torsion bar 8 is connected to the vehicle body.

Further, a trapeziform reinforcement plate 19 is welded with each trailing arm 3 and each torsion bar case 4 to connect trailing arm 3 and torsion bar case 4 thereby. This arrangement heightens the connection rigidity between trailing arm 3 and torsion bar case 4.

In order to locate a torsion center, which is positioned at a lateral center portion of connecting beam 5, above a center axis line of torsion bar cases 4, the center axis line of torsion bar case 4 is located below the vertical center of connecting beam 5 by forming a circular cutout 5a corresponding to an outside shape of torsion bar case 4 around the center axis line located to be lower than a vertical center of connecting beam 5, and connecting beam 5 is connected to torsion bar cases 4 by welding. Further, a lower side of the lateral center portion of connecting beam 5 is cut out into a trapezoid. Herein, the torsion center of connecting beam 5 is a point at which strain becomes zero in a cross section perpendicular to the vehicle lateral direction when a torsion is generated around an axis extending in the lateral direction of connecting beam 5.

Figure 3:
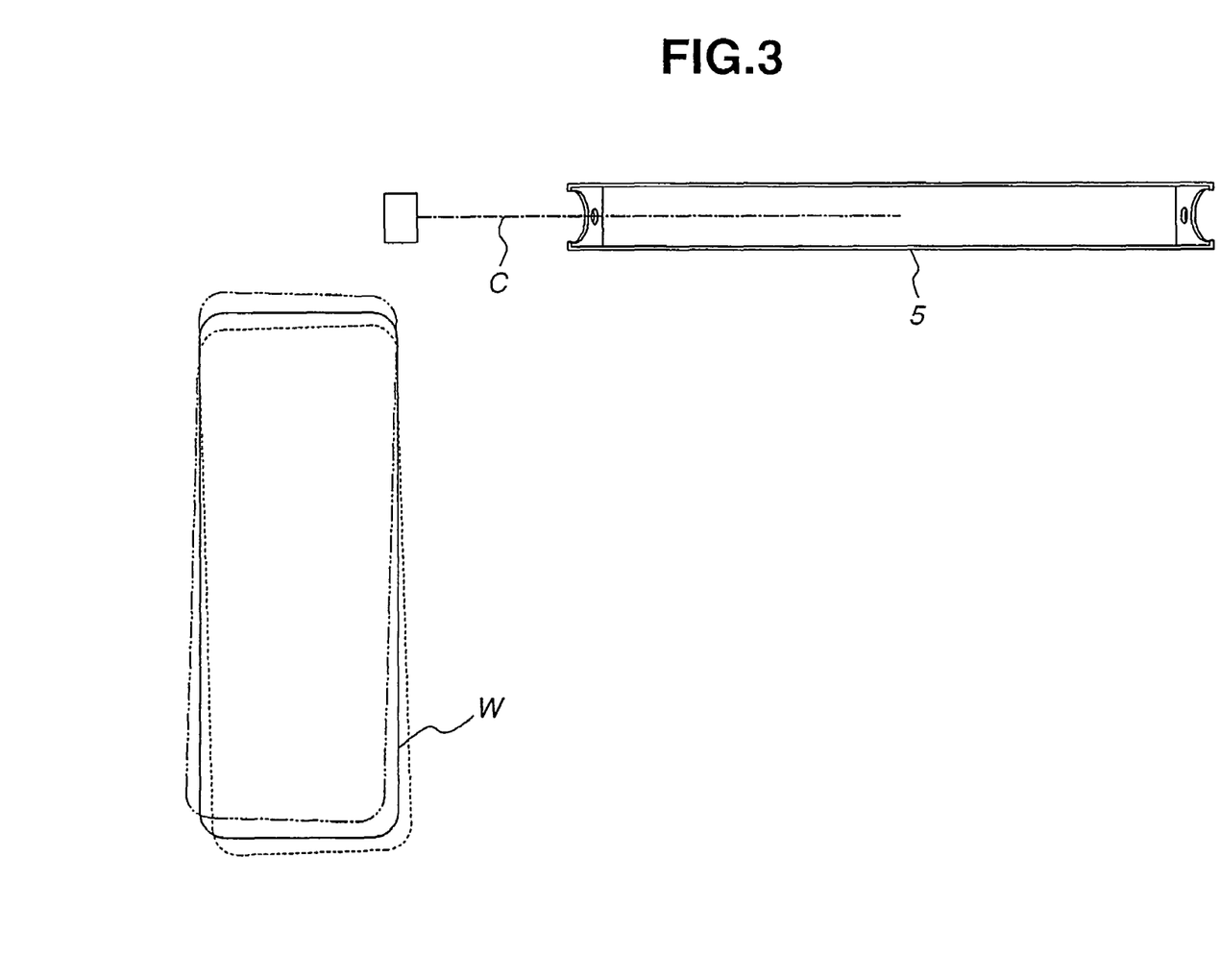
FIG. 3 is a schematic plan view showing a roll steer function of the wheel suspension system of FIG. 1.

FIG. 3 shows a schematic view showing a roll steer function of the wheel suspension system according to the embodiment of the present invention, as viewed from the downward position of the suspension system.

By locating the lateral torsion center of connecting beam 5 above torsion bar case 4 and further above the center axis line of each torsion bar 8, a swing center C of each trailing arm 3 is located on a line connecting a lateral outer end C1 of the center axis line of each torsion bar 8 and the torsion center C2 of connecting beam 5 as shown in FIG. 4. A longitudinal backward portion of trailing arm 3 protrudes toward the lateral outer portion when the vehicle bounds, and gives back to the lateral inside portion when the vehicle rebounds. Accordingly, the wheel suspension system has a roll steer characteristic that as shown in FIGS. 3 and 4, when an axle member and a wheel W, which are connected via trailing arm 3, bound, they are given toe-in, and when they rebound, they are given toe-out. The characteristic performs an under steer characteristic during the cornering running and therefore heightens the steering stability of the vehicle. It is of course that the arrangement according to the present invention is adapted to a rear wheel suspension system.

Since the wheel suspension system is arranged such that connecting beam 5 is formed into a shape having cutout 5a at a lower side of the lateral center portion thereof, the above-discussed advantages are obtained. Further it becomes possible to provide a muffler and a fuel pipe at the cutout 5a. This arrangement prevents the interference between the wheel suspension system and the muffler and the fuel pipe when the vehicle is designed to further lower a floor and increases the degree of freedom of the layout.

An additional torsion bar 20 functioning as a stabilizer is embedded in small holes 5b which are formed at both lateral end portions of connecting beam 5, as shown in FIG. 1. Since connecting beam 5 is connected to the pair of trailing arms 3 through the respective torsion bar cases 4, connecting beam 5 also functions as a stabilizer. When it is difficult to provide all of the torsion rigidity necessary for a stabilizer in connecting beam 5, by embedding additional torsion bar 20 as a stabilizer in connecting beam 5, the total torsion rigidity of connecting beam 5 is heightened so as to provide the necessary torsion rigidity in connecting beam 5.

As shown in FIG. 1, the pair of shock absorbers 2 are connected to trailing arms 3, respectively, so that a direction of a relative displacement of each shock absorber 2 is directed in the vertical direction. In order to obtain an anti-dive characteristic of dampening a nose-dive phenomenon during a vehicle braking state, each shock absorber 2 is set in a backwardly inclining state so that an upper end of each shock absorber 2 is positioned at a rear position as compared with a position of a lower end of each shock absorber 2 in the vehicle longitudinal direction. Herein, the nose-dive phenomenon is a phenomenon that a front side of the vehicle sinks during the vehicle braking state.

Figure 5A:
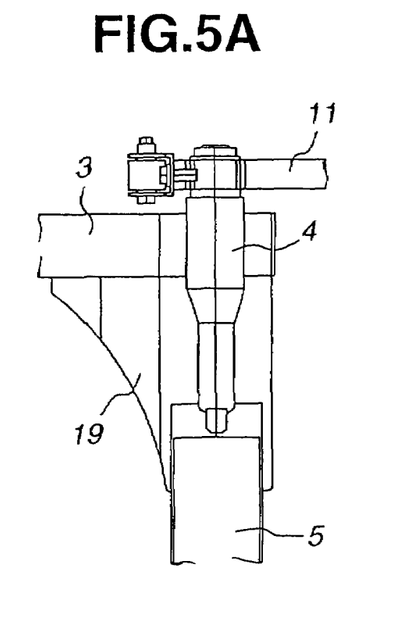
FIGS. 5A through 5D are schematic views showing a wheel suspension system according to a modification of the embodiment of the present invention.
Figure 5B:
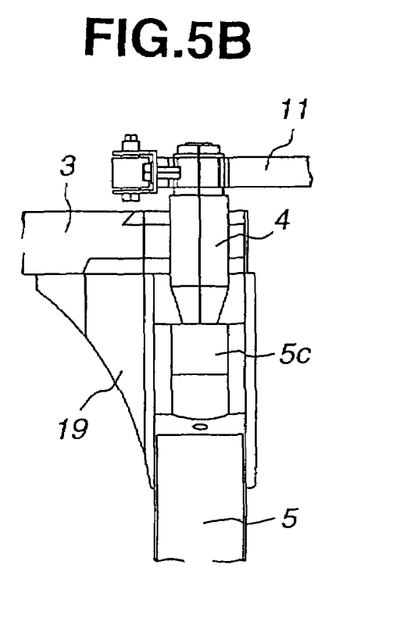
Figure 5C:
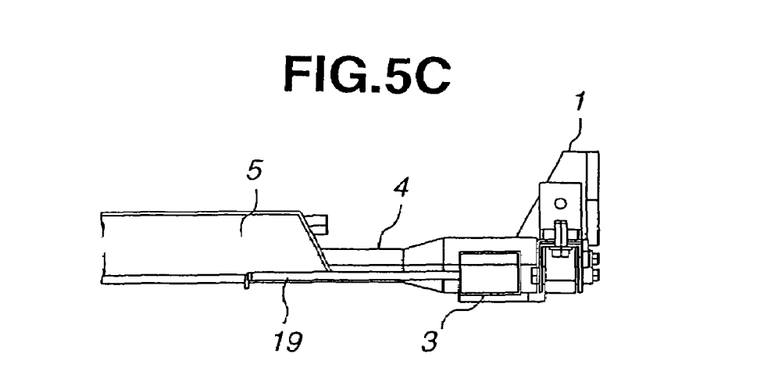
Figure 5D:
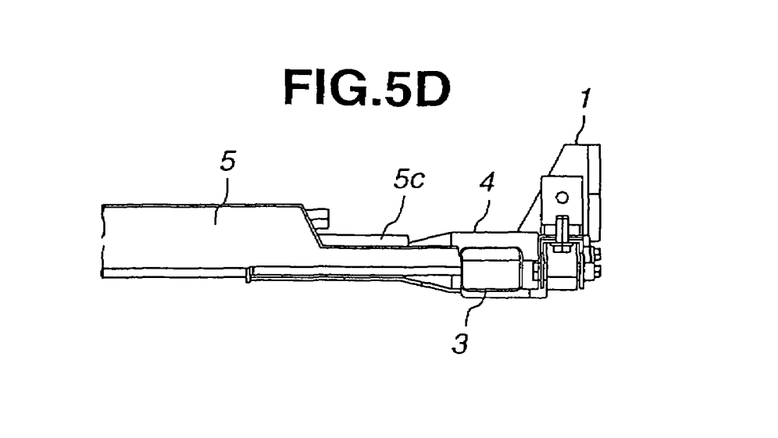

FIGS. 5B and 5D show a modification of the embodiment shown in FIGS. 1, 5A, and 5C. This modification is arranged such that connecting beam 5 further comprises a pair of extending portions 5c which are connected to both lateral outer portions of connecting beam 5 so as to cover torsion bar cases 4, respectively. Connecting beam 5 and each torsion bar case 4 are fixedly connected by welding at each lateral outer end of each extending portion 5c so that the connecting point of connecting beam 5 to torsion bar case 4 is further approached to each trailing arm 3.

With this arrangement shown in FIGS. 5B and 5D, a span of a twisted (torsional) portion of connecting beam 5 has been increased by moving the connecting point of connecting beam 5 to torsion bar case 4 toward the lateral outer side as possible. Accordingly, even when connecting beam 5 is twisted by the rebounding of one of the pair of trailing arms 3 and the bounding of the other of the pair of trailing arms 3, it becomes possible to decrease a stress generated in connecting beam 5 by this arrangement.

Figure 6A:
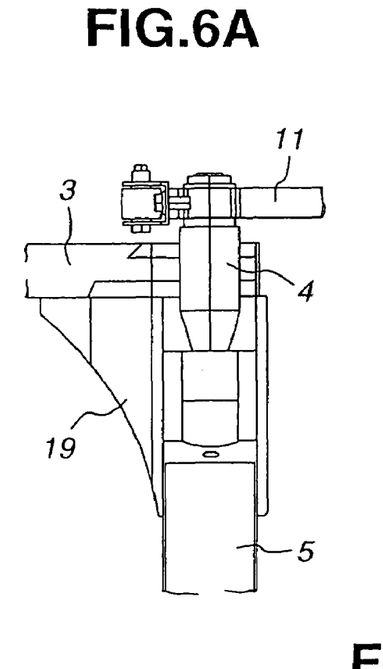
FIGS. 6A through 6D are schematic views showing a wheel suspension system according to a modification of the embodiment of the present invention.
Figure 6B:
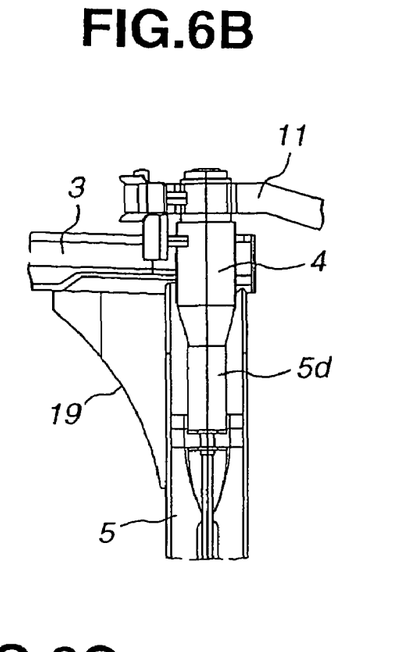
Figure 6C:
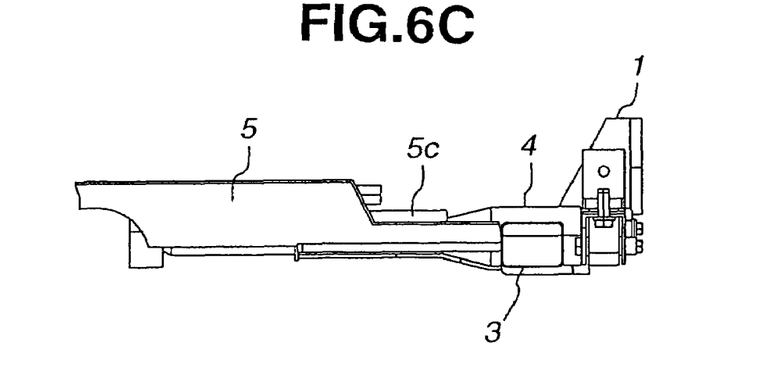
Figure 6D:
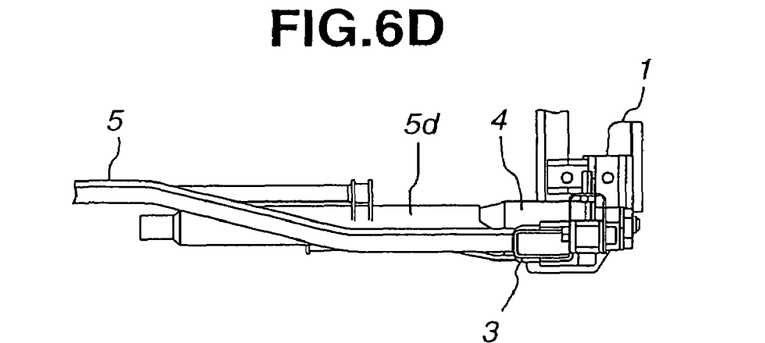

Further, FIGS. 6B and 6D show another modification of the embodiment shown in FIGS. 1, 5A, and 5C. This modification is arranged such that connecting beam 5 is formed into a slowly curved bar shape so as to upwardly protrude at a lateral center portion. This connecting beam 5 of this modification is not a box shape. Connecting beam 5 is constructed by a hollow member having a rectangular cross section in the direction perpendicular to the vehicle lateral direction. Further, connecting beam 5 has a pair of grasping portions 5d at both lateral ends thereof. Each grasping portion 5d has a cylindrical shape which covers the outer circumferential surface of torsion bar case 4.

With this arrangement shown in FIGS. 6B and 6D, connecting beam 5 is formed such that a lateral center portion is connected to a pair of side flat portions through slight gradient portions, respectively. This slow slope structure of connecting beam 5 suppresses the stress concentration at a portion which largely deforms in the vehicle lateral direction in case that connecting beam 5 is twisted by the rebound of one of the pair of trailing arms 3 and the bound of the other of the pair of trailing arms 3. Further since it is possible to locate the torsion center of connecting beam 5 above the center axis line of torsion bar case 4, it is also possible to have a roll steer characteristic.

Figure 7:
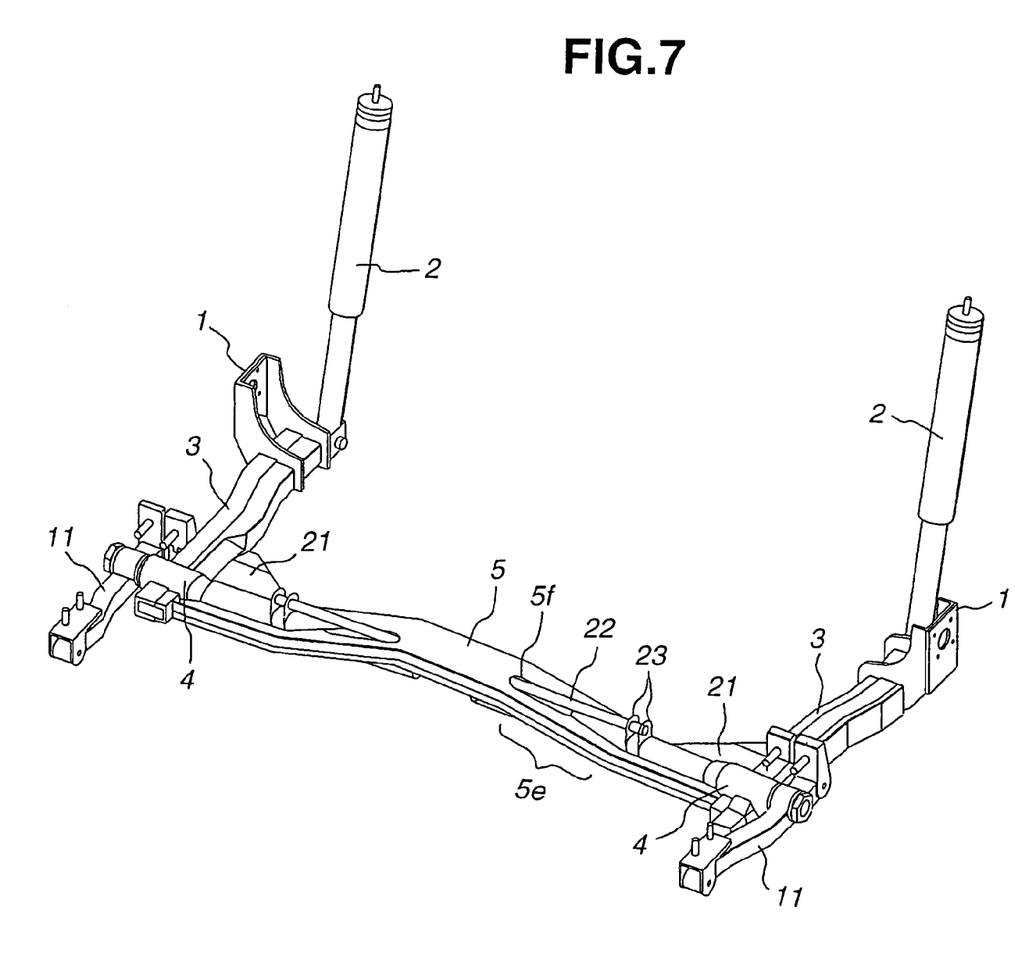
FIG. 7 is a perspective view of a wheel suspension system according to a modification of the embodiment of the present invention.

Although the above-discussed suspension system according to the present invention have been shown and described such that connecting beam 5 and each torsion bar case 4 are directly connected, such a connecting may be arranged as shown in FIG. 7. More specifically, an axle member of rotatably supporting each wheel W is connected to each trailing arm 3 through each axle bracket 1, and that each trailing arm 3 is connected to a lateral outside portion (cylindrical and extending in the lateral direction) of each torsion bar case 4. Each torsion bar 8 is connected to the lateral inside portion (extending in the laterally outer side) of torsion bar case 4. The lateral outside portion of each torsion bar 8 is connected to the vehicle body through bracket 11.

A pair of torsion bar cases 4 are connected to connecting beam 5 extending in the vehicle lateral direction and trapeziform connecting plate 21 which connects the lateral end portion of connecting beam 5 and torsion bar case 4.

With this arrangement, it becomes possible to move the torsion center to a further upper position and to decrease the weight of the suspension system, Further, it becomes possible to twist throughout connecting beam 5. Accordingly, it becomes possible to decrease a torsion quantity per unit length of connecting beam 5, and the durability of the suspension system is improved thereby. Furthermore, by the combination of the above discussed arrangement and the following structure, it becomes possible to suppress the stress concentration to connecting beam 5 and therefore the durability of the suspension system is improved.

Figure 8A:
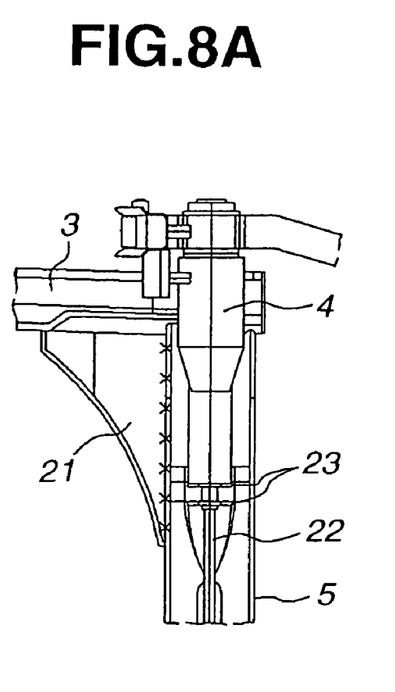
FIGS. 8A and 8B are schematic views showing a wheel suspension system according to a modification of the embodiment of the present invention.
Figure 8B:
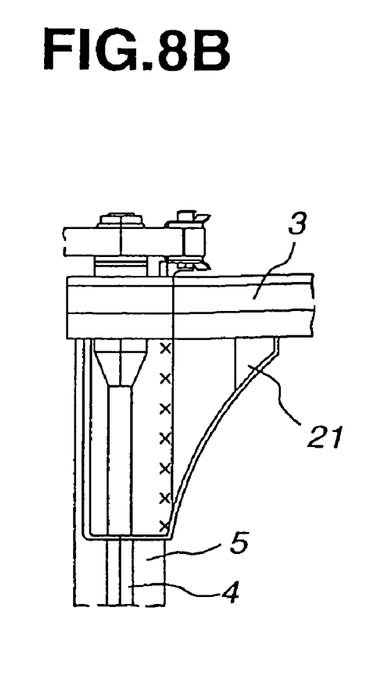

More specifically, as shown in FIG. 7, connecting beam 5 is curved so as to protrude the lateral center portion of connecting beam 5 upwardly. As shown in FIG. 8, connecting plate 21 and connecting beam 5 are connected at one of the lateral end portion and the longitudinally rear end portion of connecting beam 5 by welding. As shown in FIGS. 7 and 8, the lateral length of connecting beam 5 is extended so that the lateral outside end of connecting beam 5 is located in the vicinity of trailing arm 3. In FIG. 8, mark X denotes a welded portion.

By arranging connecting beam 5 such that as shown in FIG. 7, connecting beam 5 is curved so as to protrude the lateral center portion of connecting beam 5 upwardly, an angle of a slope portion of connecting beam 5 relative to the lateral horizontal direction becomes slow. Therefore, even when connecting beam 5 is twisted by the rebound of one of the pair of right and left trailing arms 3 and by the bound of the other of the pair of right and left trailing arms 3, the stress concentration at a part where the change of shape in the lateral direction of connecting beam 5 is suppressed.

By arranging connecting beam 5 such that as shown in FIGS. 8A and 8B, connecting plate 21 and connecting beam 5 are connected at one of the lateral end portion and the longitudinally rear end portion of connecting beam 5 by welding, it is possible that one of the vehicle longitudinal both ends of each lateral end portion of connecting beam 5 is maintained as a free end without being connected to connecting plate 21. Accordingly, when connecting beam 5 is twisted, the free end is capable of laterally moving, and therefore connecting beam 5 is equivalently in the lateral direction. Therefore, the stress concentration due to the twisting of connecting beam 5 is suppressed.

By arranging connecting beam 5 such that as shown in FIGS. 7, 8A and 8B, the lateral length of connecting beam 5 is extended so that the lateral outside end of connecting beam 5 is located in the vicinity of trailing arm 3, it is possible to set the lateral dimension of connecting beam 5 at a possible maximum value. Therefore, the magnitude of the stress generated by the torsion of connecting beam 5 is suppressed.

Figure 9A:
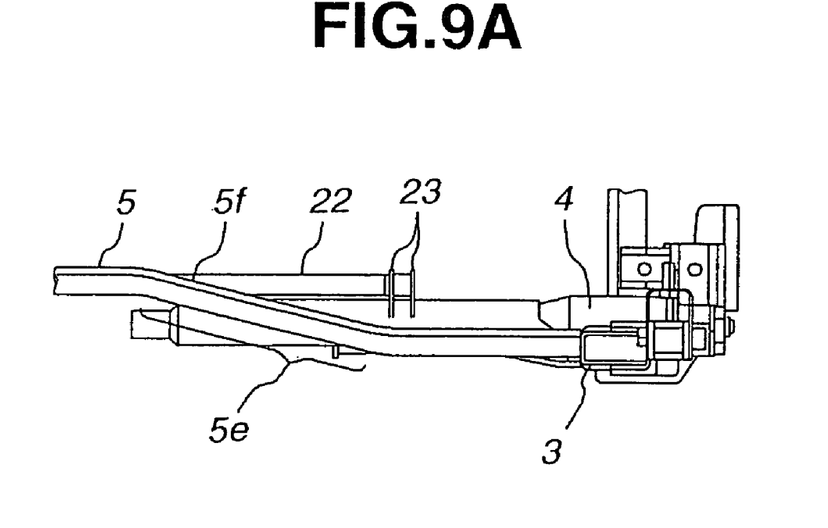
FIGS. 9A and 9B are schematic views showing a wheel suspension system according to a modification of the embodiment of the present invention.
Figure 9B:
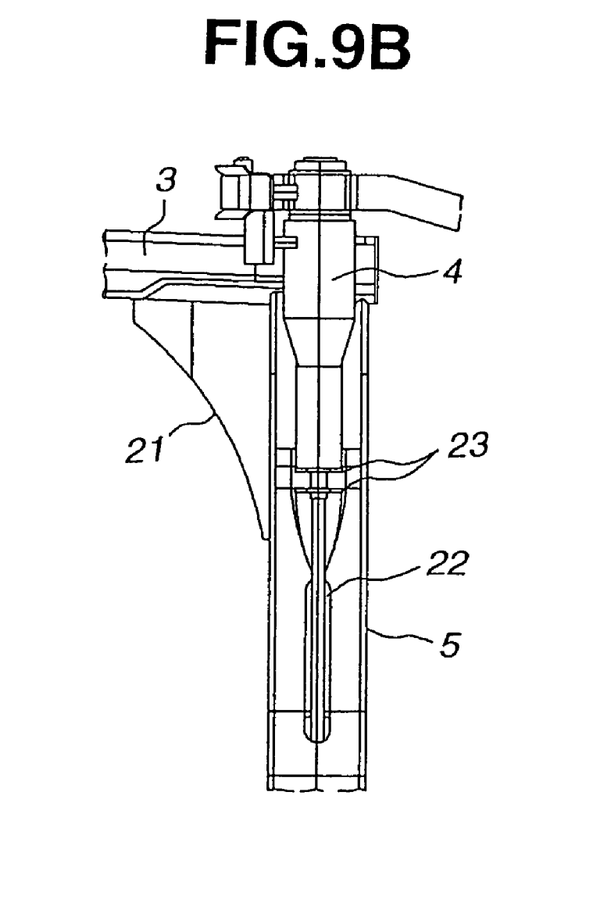

FIGS. 9A and 9B show another modification of the wheel suspension system according to the present invention. This modification is arranged such that a through-hole 5f is formed at inclined portion 5e of connecting beam 5, and additional torsion bar 22 extending in the lateral direction penetrates through-hole 5f. Accordingly, the lateral both end portions of additional torsion bar 22 are connected to the upper surface of connecting beam 5 through brackets 23. Additional torsion bar 22 is not fixed to connecting beam 5. Herein, inclined portion 5e is a portion from a position at which starts displacing upwardly toward the lateral center portion to a position at which the upward displacement is terminated.

With this arrangement, it becomes possible to elongate the lateral dimension of addition torsion bar 22 as compared with the arrangement shown in FIGS. 1 and 2 in which additional torsion bar 20 is connected to both end portions of box-shaped connecting beam 5. Therefore, it becomes possible to suppress the stress generated at additional torsion bar 22 by the torsion in case that additional torsion bar 22 functions as a stabilizer. Further, since it is possible to approach an elastic center of additional center 22 to an elastic center of connecting beam 5, as compared with the arrangement shown in FIG. 1, additional torsion bar 22 further functionally and effectively performs as a stabilizer.

Figure 10A:
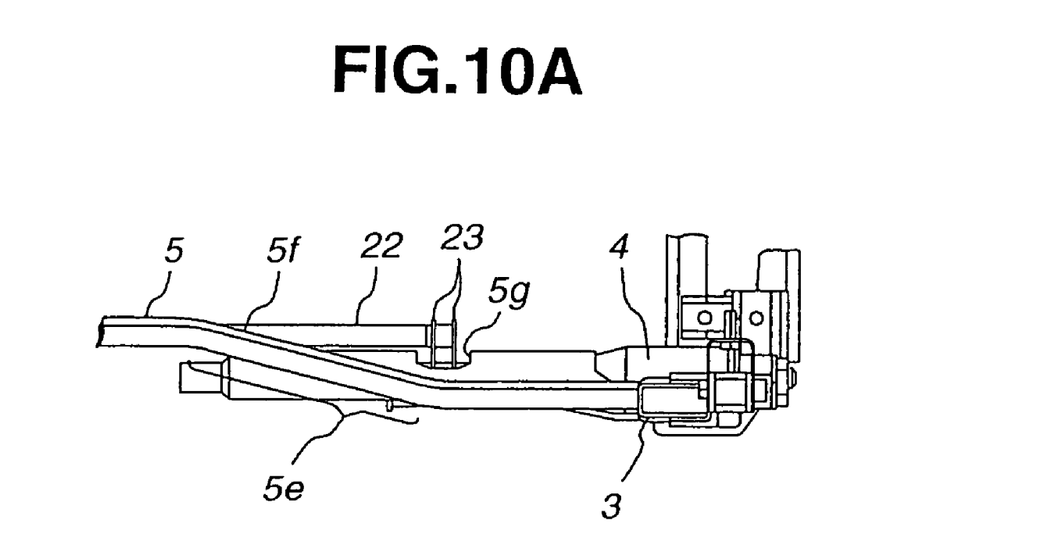
FIGS. 10A and 10B are schematic views showing a wheel suspension system according to a modification of the embodiment of the present invention.
Figure 10B:
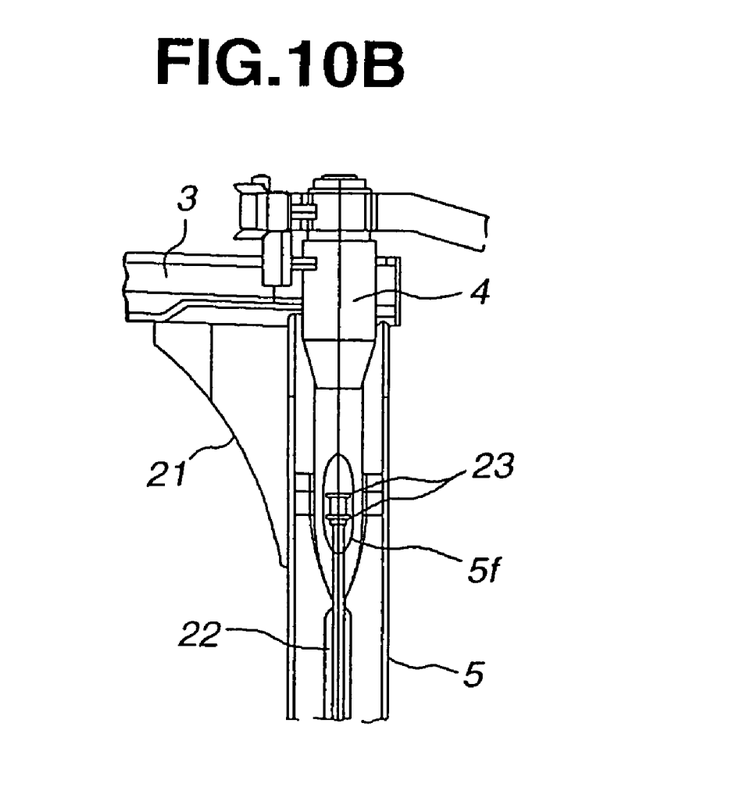

FIGS. 10A and 10B show another modification of the wheel suspension system according to the present invention.

This modification is arranged such that a through-hole 5f is formed at inclined portion 5e of connecting beam 5, and additional torsion bar 22 extending in the lateral direction penetrates through-hole 5f. Accordingly, the lateral both end portions of additional torsion bar 22 are connected to torsion bar cases 4 through brackets 23. A hole 5g is formed at an upper surface of connecting beam 5 so that bracket 23 can connect additional torsion bar 22 and torsion bar case 4. Accordingly, additional torsion bar 22 is not fixed to connecting beam 5.

With this arrangement, it becomes possible to elongate the lateral dimension of addition torsion bar 22, and therefore it becomes possible to suppress the stress generated at additional torsion bar 22 by the torsion in case that additional torsion bar 22 functions as a stabilizer. Further, additional torsion bar 22 further functionally and effectively performs as a stabilizer. Furthermore, since the pair of torsion bar cases 4 are directly connected to additional torsion bar 22, the function of additional torsion bar 22 as a stabilizer is further improved.

In the above-discussed embodiment and modifications thereof, a bush is disposed between the wheel suspension system and the vehicle body so as to damp the vehicle vibration by decreasing a road input. It is preferable that such bush is arranged in the wheel suspension system according to the present invention, as follows.

Figure 11A:
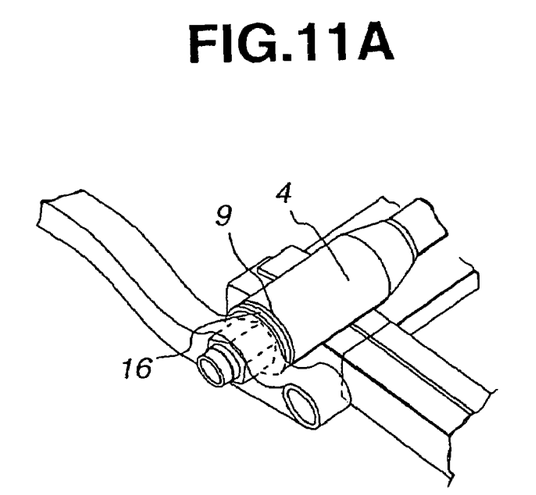
FIGS. 11A through 11C are schematic views showing a wheel suspension system according to a modification of the embodiment of the present invention.
Figure 11B:
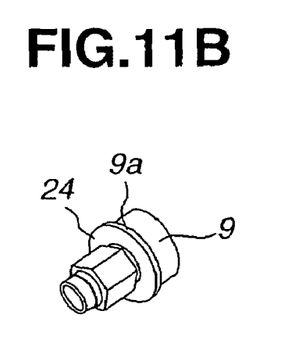
Figure 11C:
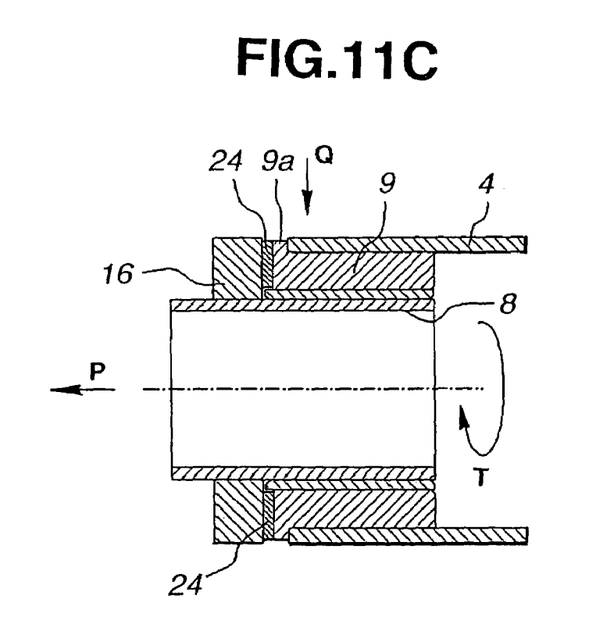

As shown in FIGS. 11A, 11B and 11C, a cylindrical outer bush 9 is disposed between the lateral outside portion of torsion bar case 4 and the lateral outside portion of torsion bar 8, and an annular flange portion 9a protruding outwardly is formed at a lateral outside portion of outer bush 9. Flange portion 9a of outer bush 9 is sandwiched by the lateral outside end of torsion bar case 4 and a washer 16 provided adjacent to a lateral outside of the lateral outside end of torsion bar case 4. The arrangement as to the connection between torsion bars 8 and the vehicle body is the same as that shown in FIG. 2.

With this arrangement shown in FIGS. 11A through 11C, it becomes possible to solve the problem that the rigidity of the bush in the axial direction P becomes too small as compared with the rigidity of the bush in the direction Q perpendicular to the axial direction P, due to a volumetric shortage of the bush, which problem is generated in the conventional cylindrical bush.

More specifically, by sandwiching flange portion 9a of outer bush 9 between the lateral end of torsion bar case 4 and washer 16, the rigidity of outer bush 9 in the axial direction P is added to the compression rigidity of flange portion 9a of outer bush 9. By this addition, the rigidity of outer bush 9 in the axial direction P is heightened and therefore the above discussed problem is solved. In general, it is generally preferable that the rigidity of a bush in the direction perpendicular to the axial direction of the bush is small in view of decreasing the vibration transmission in the vehicle longitudinal direction and that the rigidity of the bush in the axial direction is large in view of increasing a steering stability.

Further, as shown in FIG. 11C, a sliding member 24 is disposed between washer 16 and the end of outer bush 9 so as to reduce friction therebetween. With arrangement of sliding member 24, friction between the end of outer bush 9 and the washer 16 is decreased and therefore the rotation of torsion bar 8 in the direction T in FIG. 11C is smoothly executed by preventing the friction from being increased by the input of the lateral force to the wheel. Accordingly, the ride comfort of the vehicle is improved thereby. It is preferable that sliding member 24 is a sheet member which is made of "Teflon" trademark (polytetrafluoroethylene) and has a canvas like surface.

With the thus arranged embodiment and modifications thereof according to the present invention, the pair of torsion bar cases 4 are connected by connecting beam 5 and are support at two connecting points of the vehicle body through the pair of torsion bars 8 so as to revoke the arrangement of connecting the lateral inside portions of torsion bar cases 4 to the floor of the vehicle body. Therefore, it becomes possible to prevent the noise transferring from a road surface through the wheels, the axle members, the trailing arms and the torsion bar cases to the floor of the vehicle body and thereby preventing the noises due to the input from the road in a passenger compartment. Further, since connecting beam 5 is connected to the pair of trailing arms 3, connecting beam 5 functions as a stabilizer for keeping the balance of the vehicle body during the rolling of the vehicle.

This application is based on Japanese Patent Applications No. 2004-212922 filed on Jul. 21, 2004 and No. 2004-334860 filed on Nov. 18, 2004 in Japan. The entire contents of these Japanese Patent Applications are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A wheel suspension system for suspending wheels rotatably supported by axle members for a vehicle, comprising:
    a pair of trailing arms extending in a vehicle longitudinal direction, wherein the trailing arms are connected to respective ones of the axle members;
    a pair of torsion bar cases extending in a vehicle lateral direction, wherein a lateral outside portion of each of the torsion bar cases is directly fixed to a respective one of the trailing arms;
    a pair of torsion bars connected to lateral inside portions of the torsion bar cases, wherein a lateral outside portion of each of the torsion bars is connected to a vehicle body; and
    a connecting beam extending in the vehicle lateral direction, wherein the connecting beam has a connecting point fixed relative to one of the pair of torsion bar cases and a connecting point fixed relative to another of the pair of torsion bar cases.

2. The wheel suspension system as claimed in claim 1, wherein a torsion center located at a lateral center portion of the connecting beam is positioned above a center axis line of the torsion bar cases.

3. A wheel suspension system for suspending wheels rotatably supported by axle members for a vehicle, comprising:
    a pair of trailing arms extending in a vehicle longitudinal direction, wherein the trailing arms are connected to respective ones of the axle members;
    a pair of torsion bar cases extending in a vehicle lateral direction, wherein a lateral outside portion of each of the torsion bar cases is connected to a respective one of the trailing arms;
    a pair of torsion bars connected to lateral inside portions of the torsion bar cases, wherein a lateral outside portion of each of the torsion bars is connected to a vehicle body; and
    a connecting beam extending in the vehicle lateral direction, wherein the pair of torsion bar cases are connected with each other through the connecting beam;

wherein a torsion center located at a lateral center portion of the connecting beam is positioned above a center axis line of the torsion bar cases;

wherein the center axis line of the torsion bar cases is positioned below a vertical center of the connecting beam.

4. A wheel suspension system for suspending wheels rotatably supported by axle members for a vehicle, comprising:

a pair of trailing arms extending in a vehicle longitudinal direction, wherein the trailing arms are connected to respective ones of the axle members;

a pair of torsion bar cases extending in a vehicle lateral direction, wherein a lateral outside portion of each of the torsion bar cases is connected to a respective one of the trailing arms;

a pair of torsion bars connected to lateral inside portions of the torsion bar cases, wherein a lateral outside portion of each of the torsion bars is connected to a vehicle body; and a connecting beam extending in the vehicle lateral direction, wherein the pair of torsion bar cases are connected with each other through the connecting beam;

wherein a torsion center located at a lateral center portion of the connecting beam is positioned above a center axis line of the torsion bar cases;

wherein a lower portion of the lateral center portion of the connecting beam is cut out.

5. A wheel suspension system for suspending wheels rotatably supported by axle members for a vehicle, comprising:

a pair of trailing arms extending in a vehicle longitudinal direction, wherein the trailing arms are connected to respective ones of the axle members;

a pair of torsion bar cases extending in a vehicle lateral direction, wherein a lateral outside portion of each of the torsion bar cases is connected to a respective one of the trailing arms;

a pair of torsion bars connected to lateral inside portions of the torsion bar cases, wherein a lateral outside portion of each of the torsion bars is connected to a vehicle body; and a connecting beam extending in the vehicle lateral direction, wherein the pair of torsion bar cases are connected with each other through the connecting beam;

wherein a torsion center located at a lateral center portion of the connecting beam is positioned above a center axis line of the torsion bar cases;

further comprising an additional torsion bar which extends in the vehicle lateral direction and is embedded in a vertical upper portion of the connecting beam.

6. A wheel suspension system for suspending wheels rotatably supported by axle members for a vehicle, comprising:

a pair of trailing arms extending in a vehicle longitudinal direction, wherein the trailing arms are connected to respective ones of the axle members;

a pair of torsion bar cases extending in a vehicle lateral direction, wherein a lateral outside portion of each of the torsion bar cases is connected to a respective one of the trailing arms;

a pair of torsion bars connected to lateral inside portions of the torsion bar cases, wherein a lateral outside portion of each of the torsion bars is connected to a vehicle body; and a connecting beam extending in the vehicle lateral direction, wherein the connecting beam has a connecting point fixed relative to one of the pair of torsion bar cases and a connecting point fixed relative to another of the pair of torsion bar cases;

wherein diameters of connecting portions of each of the torsion bar cases are greater than a diameter of a lateral inside portion of each of the torsion bar cases.

7. A wheel suspension system for suspending wheels rotatably supported by axle members for a vehicle, comprising:

a pair of trailing arms extending in a vehicle longitudinal direction, wherein the trailing arms are connected to respective ones of the axle members;

a pair of torsion bar cases extending in a vehicle lateral direction, wherein a lateral outside portion of each of the torsion bar cases is connected to a respective one of the trailing arms;

a pair of torsion bars connected to lateral inside portions of the torsion bar cases, wherein a lateral outside portion of each of the torsion bars is connected to a vehicle body; and a connecting beam extending in the vehicle lateral direction, wherein the connecting beam has a connecting point fixed relative to one of the pair of torsion bar cases and a connecting point fixed relative to another of the pair of torsion bar cases;

wherein a lateral inside portion of each torsion bar case is rotatably connected to the connecting beam.

8. The wheel suspension system as claimed in claim 1, wherein the connecting beam has a curved shape so that a lateral center portion of the connecting beam protrudes upwardly.

9. The wheel suspension system as claimed in claim 1, wherein each of the trailing arms and a respective one of the torsion bar cases are connected through a reinforcement plate.

10. The wheel suspension system as claimed in claim 1 wherein each of the connecting points of the connecting beam to the torsion bar cases is positioned at a lateral outer side so as to approach a respective one of the trailing arms.

11. The wheel suspension system as claimed in claim 1, further comprising connecting plates which connect lateral end portions of the connecting beam to the torsion bar cases, respectively.

12. The wheel suspension system as claimed in claim 11, wherein the connecting beam is curved so that a lateral center portion of the connecting beam protrudes upwardly.

13. The wheel suspension system as claimed in claim 11, wherein each of the connecting plates and the connecting beam are connected only at one of vehicle longitudinal ends of a lateral end portion of the connecting beam.

14. The wheel suspension system as claimed in claim 13, wherein a lateral outer end of the connecting beam is located adjacent to one of the trailing arms.

15. The wheel suspension system as claimed in claim 12, wherein an additional torsion bar penetrates two inclined portions of the connecting beam, and both lateral end portions of the additional torsion bar are connected to the connecting beam through brackets, respectively.

16. The wheel suspension system as claimed in claim 12, wherein an additional torsion bar penetrates two inclined portions of the connecting beam, and both lateral end portions of the additional torsion bar are connected to the torsion bar cases through brackets, respectively.

17. The wheel suspension system as claimed in claim 1, wherein an outer bush is disposed between a lateral outside portion of each of the torsion bar cases and a lateral outside portion of a respective one of the torsion bars, and a flange portion, which protrudes outwardly in a radial direction of the outer bush at a lateral outside portion of the outer bush, is sandwiched between a lateral outside end of each of the torsion bar cases and a washer provided adjacent to the lateral outside end.

18. The wheel suspension system as claimed in claim 17, further comprising a friction decreasing means for decreasing friction between the outer bush and the washer.

19. A wheel suspension system for suspending wheels rotatably supported by axle members for a vehicle, comprising:
- a pair of trailing arms extending in a first direction, wherein the trailing arms are connected to respective ones of the axle members;
- a pair of torsion bar cases extending in a second direction perpendicular to the first direction, wherein an outside portion of each of the torsion bar cases is directly fixed to a respective one of the trailing arms;
- a pair of torsion bars extending in the second direction, wherein each of the torsion bars is connected to an inside portion of a respective one of the torsion bar cases, an outside portion of each of the torsion bars being connected to a vehicle body; and
- a connecting beam extending in the second direction, wherein the connecting beam has a connecting point fixed relative to one of the pair of torsion bar cases and a connecting point fixed relative to another of the pair of torsion bar cases.

* * * * *